United States Patent [19]

Tosima

[11] 4,281,407
[45] Jul. 28, 1981

[54] SURFACE ACOUSTIC WAVE PICKUP AND RECORDING DEVICE

[75] Inventor: Soitiro Tosima, Machida, Japan

[73] Assignee: RCA Corporation, New York, N.Y.

[21] Appl. No.: 103,444

[22] Filed: Dec. 14, 1979

[51] Int. Cl.³ .......................... G11B 3/00; H04R 17/04
[52] U.S. Cl. .............................. 369/130; 310/313 R; 310/334; 369/131; 369/132; 369/137; 369/173; 369/47
[58] Field of Search ............... 179/100.4 C, 100.41 P, 179/100.41 J, 100.41 R, 100.1 G; 310/313, 334, 335

[56] References Cited

U.S. PATENT DOCUMENTS

| 3,369,199 | 2/1968 | Sittig | 310/335 |
| 3,824,352 | 7/1974 | Adler et al. | 179/100.41 P |
| 3,865,997 | 2/1975 | Halter | 179/100.4 C |
| 3,946,256 | 3/1976 | Day et al. | 310/334 |
| 3,975,698 | 8/1976 | Redman | 310/313 A |
| 4,011,747 | 3/1977 | Shaw | 310/313 R |
| 4,037,253 | 7/1977 | Nagaoka | 179/100.41 P |
| 4,063,198 | 12/1977 | Wagers et al. | 310/313 B |

OTHER PUBLICATIONS

Toda et al., "Surface Acoustic Wave Absorber and Application to Low Spurious Mode SAW Device," Trans. IECE Japan, vol. E60, No. 5, pp. 237-238, May 1977.
Smith et al., "Analysis of Interdigital Surface Wave Transducers by Use of an Equivalent Circuit Model," IEEE Trans. Microwave Theory and Tech., pp. 856-864, Nov. 1969.
Hickernell, "DC Triode Sputtered Zinc Oxide Surface Elastic Wave Transducers," J. Appl. Physics, vol. 44, No. 2, Mar. 1973.

Primary Examiner—James W. Moffitt
Assistant Examiner—Donald McElheny, Jr.
Attorney, Agent, or Firm—E. M. Whitacre; J. S. Tripoli; J. E. Roehling

[57] ABSTRACT

A surface acoustic wave (SAW) pickup and record stylus is constructed from an elongated substrate which supports the propagation of SAW. The substrate is tapered to a tip at one end and a fan-shaped interdigital electrode structure having curved fingers is formed thereon. During operation in the pickup mode a beam of SAW is focused to the tip of the stylus which is arranged in contact with a record medium. During playback, the beam reflected by the record medium generates a signal in the interdigital electrode of the stylus representative of the acoustic conditions at the stylus tip and, correspondingly, of the information recorded on the record medium surface. In the record mode the stylus is brought into contact with a record medium. During recording, the input power applied to the interdigital electrode is increased to effect a deformation of the surface of the record medium representative of the information to be recorded.

10 Claims, 8 Drawing Figures

SURFACE ACOUSTIC WAVE PICKUP AND RECORDING DEVICE

The present invention relates generally to surface acoustic wave devices and more particularly to surface acoustic wave transducers for recording and playback of high density information on a record medium.

BACKGROUND OF THE INVENTION

A variety of approaches to information recording and playback exist in the prior art. Electromechanical processes are commonly used in the audio industry for recording groove modulations representative of an audio signal in a lacquer master. One "passive" transducer system employs a phonograph stylus and an electromechanical transducer device to derive signal recorded on a record medium surface (e.g., disc).

Recently, it has been demonstrated that video disc-type records can be played back by a piezoelectric pressure sensor. This type of system, which is essentially an extrapolation of audio record systems, provides fairly good performance, at least when the needle and the record are clean and new.

A cutterhead for electromechanically recording a video signal in a metal master is described in U.S. Pat. No. 3,865,997 issued to J. B. Halter on Feb. 11, 1975 entitled, "TRIANGULAR PIEZOELECTRIC TRANSDUCER FOR RECORDING VIDEO INFORMATION". In that patent the cutting stylus employed for recording groove modulations in the master is modulated in accordance with the video information which is to be recorded.

These "passive" transducer systems have been successful despite a number of problems. For instance, piezoelectric recording transducers may have resonance problems which add cost and compromise performance. One shortcoming of the phonograph transducer is that it is often operated at close to its practical limit in terms of its ability to record high frequency information signals.

These and other shortcomings may be overcome by using an "active" transducer system. In an active playback system energy is focused on a target, for example an information bit positioned on a recording surface, and the reflected energy carries back the recorded signal information, somewhat analogous to radar. One type of "active" transducer system which is utilized for video recording and playback is the optical video disc system as described in U.S. Pat. No. 4,097,895, issued to Fred W. Spong on June 27, 1978, entitled "MULTI-LAYER OPTICAL RECORD". This system performs well, but like other optical systems, tends to be complicated because of the laser and associated precision optics and, moreover, energy path losses tend to be high.

SUMMARY OF THE INVENTION

The present invention attempts to overcome the above problems through the provision of apparatus which makes possible a low cost, efficient recording/playback system using an "active" transducer.

In accordance with the principles of the present invention, a surface wave device is provided which comprises a substrate and a fan-shaped interdigital electrode provided on one end of the substrate. This surface wave device may be used as a stylus for recording and/or reproducing information signals on a record medium.

In addition, it is possible that the surface wave device of the present invention may be used for non-recording/playback applications such as biological applications (surgery), mechanical alterations of very small areas of micro-circuitry, identification of various materials based on their acoustic properties, and determination of thin film thicknesses.

BRIEF DESCRIPTION OF THE DRAWINGS

Other features and advantages of the present invention will be recognized by those skilled in the art upon a reading of the following detailed description and inspection of the accompanying drawing in which.

DETAILED DESCRIPTION OF THE PREFERRED EMBODIMENTS

The energy in a surface acoustic wave (hereinafter SAW) is propagated along the surface of a substrate within a layer of about one wavelength thickness. Acoustic loading of the propagating surface affects the propagation properties of the SAW device. For example, air loading of a propagation surface results in detectable propagation losses and loading of very thin molecular layers on the surface can cause harmonic generation of surface acoustic waves. If a SAW beam is concentrated into a small region on a surface, then it appears that the SAW is particularly sensitive to acoustic loading in that region. The novel device described herein makes use of the acoustic loading effect of concentrated SAW's.

Figure 1:
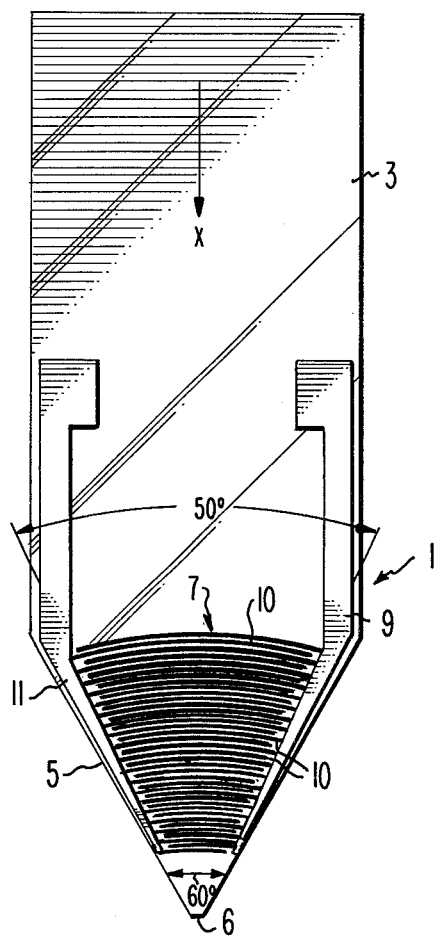
FIG. 1 is a plan view of a surface acoustic stylus exhibiting a construction in accordance with the principles of the present invention.

Referring to FIG. 1, a plan view of stylus 1 is illustrated. Stylus 1 consists of a substrate 3 which, illustratively, may be formed of a piezoelectric material such as lithium niobate or single crystal quartz. One end of substrate 3 is shaped to form tip 5 which may, for example, be formed by grinding the sides of substrate 3 to a 60° included angle, thus forming nib 6. At tip 5, a fan-shaped electrode 7 is deposited on one surface of substrate 3 by techniques well-known in the SAW arts. Electrode 7 includes two conductors 9 and 11 having fingers 10 which are interdigitized to form pairs of curved interlocked conductors (illustratively, 20 pairs of conductors). Illustratively, electrode 7 is arranged on tip 5 at an angle slightly less than the tip angle, for example, 50°. The spacing between successive fingers 10 of electrode 7 is made equal to one-half of the wavelength of the signal which is to be applied. In one particularly successful format, styli were formed from Y-cut quartz plates, typically 1.5 cm long along an x-axis, 5 mm wide and 1 mm thick having a nib of 10–20 μm width.

Figure 2:
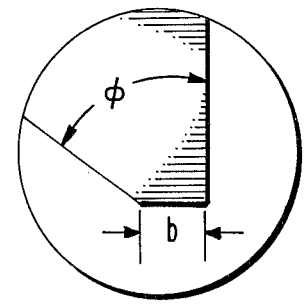
FIG. 2 is an enlarged side view of the tip of the stylus of FIG. 1.

An enlarged side view of tip 5 is illustrated in FIG. 2. In this view, tip 5 is further sharpened at an angle φ in a form like the prow of a boat. Illustratively, angle φ is approximately 75° and "b" is equal to approximately 10–20 μm.

Electrode 7 is shaped to focus the SAW power at the nib of the stylus. It has been discovered that the behavior of the surface acoustic waves at the stylus tip depends upon whether or not the tip is in contact with another material, and, if it is in contact with another material, upon the acoustic characteristics of the contacted material. When the tip is free, practically all of the waves focused at nib 6 are reflected back toward electrode 7 (analogous to an open circuit at the end of a waveguide). When nib 6 touches another material a fraction of the focused power is reflected back toward electrode 7, a fraction is absorbed in the contacted material and a fraction generates bulk waves in the substrate material. The magnitude and phase of the SAW power reflected from nib 6 is representative of the acoustic loading. When the stylus of the present invention is used as a pickup device the reflected surface acoustic wave interferes with the incident surface acoustic wave and modulates the impedance of stylus 1 such that, as the stylus contacts a surface of a record medium which has prerecorded information stored in the form of pits, the impedance of stylus 1 as measured or detected at the conductors 9 and 11 varies in accordance with the information stored on the record medium surface. That is, the pit regions represent one acoustic load and the non-pit regions represent another acoustic load.

It is believed that the pickup device of the present invention detects the acoustic loading at the stylus nib and not the gross motion of the stylus itself. In principle, this is quite different from the operation of other electromechanical transducer devices where gross mechanical strains of the stylus as a whole are converted into detectable piezoelectric signals.

Figure 3:
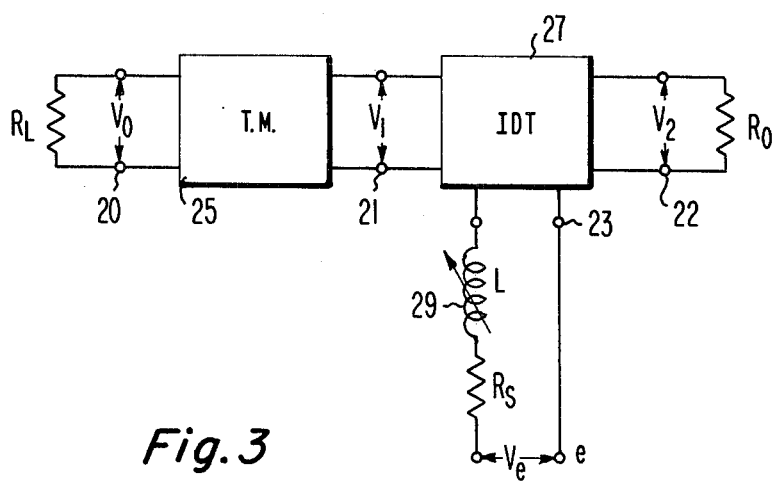
FIG. 3 is an equivalent circuit schematic of the interdigital transducer system of the present invention.

An equivalent circuit schematic of the interdigital transducer system of the present invention is illustrated in FIG. 3. A SAW launched from one side 21 (port 1) of interdigital transducer 27 toward stylus tip 20 (port 0) through transmission medium 25 is partially dissipated by mode conversion of bulk waves and by transfer to any material in contact with the tip. This power dissipation is described by the load resistance $R_L$ terminating the port 0. The SAW power radiated from the other side 22 (port 2) of the interdigital transducer is absorbed by an appropriate medium and no power is reflected back. This behavior is described by a characteristic impedance $R_o$ terminating at port 2. The input side 23 (port 3) of the interdigital transducer 27, i.e., the port too which power is applied, completes a 3-port description of the interdigital transducer.

Approximately half of the SAW power generated by the interdigital transducer 27 is radiated from the interdigital transducer in a direction opposite to that of the tip (i.e., into port 2). To reduce any potential interfering effect that the power generated in port 2 may have, an appropriate acoustic wave absorber (not shown), illustratively, a piece of cellophane tape, is attached to the stylus surface behind the interdigital electrode. This absorber not only absorbs the SAW power radiated to the back side (i.e., port 2) of the transducer, but also the power reflected from the tip and returning to the vicinity of the interdigital electrode but not captured thereby. Controlled reflecting means which may help to conserve these wasted powers will be described with reference to FIG. 8.

When stylus 1 is in a free state, i.e., not in contact with a record medium, the impedance of the interdigital transducer 27 appears to be primarily capacitive (for example, an interdigital transducer of the form illustrated with reference to FIG. 1 will have a capacitance of approximately 2.3 pF). A tunable inductor 29 may be connected in series with the interdigital transducer 27 to compensate for the transducer capacitance.

When the stylus tip is brought into contact with other materials, a portion of the incident SAW power is transferred to these materials. In addition, there is a power transfer into a reflected bulk wave as well as into a SAW beam that returns to the interdigital transducer. The reflected SAW interferes with the generated SAW thereby effecting a change in the impedance of the transducer.

The impedance change of transducer 27 also appears to be affected by the stylus contacting force and the composition of the material being contacted by the stylus. The impedance change due to the stylus contacting force tends to level off as the contact force increases beyond a given value, for example, it has been found experimentally with the stylus as illustrated above with respect to FIG. 1 that impedance variations level off at values of contact force above 1 gram. The fact that the material composition affects the impedance variations makes it possible to use the stylus of FIG. 1 for identifying particular materials by comparing the impedance variation due to an unknown sample with the variations caused by standard samples.

Figure 4:
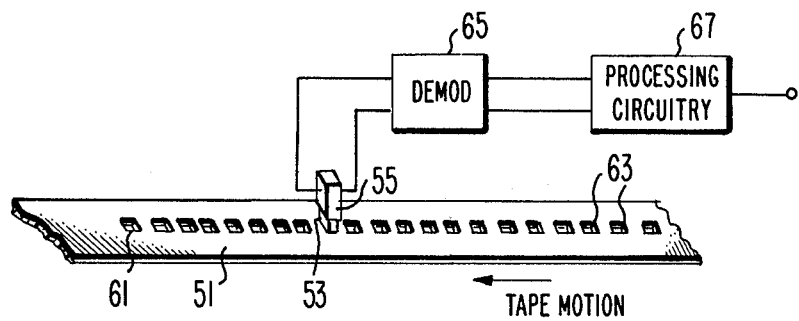
FIG. 4 provides a representation, partially in block diagram form, of a SAW playback apparatus suitable for use in recovery of information.

Referring to FIG. 4, a representation of a SAW-type playback system suitable for use in the practice of the present invention is provided. A tape 51 (illustratively, of a vinyl material) is moved relative to a stylus 53 (i.e., of a type described with reference to FIG. 2). Stylus 53 is mounted into support 55 such that its tip rests on the surface of tape 51.

In one illustrative system, an information track 61 comprises a succession of spaced pits 63 formed in the surface of tape 51. Variations in the length and separation of the pits is representative of the information recorded on the tape surface. Information track 61 comprises undisturbed surface regions which effect a first impedance in the transducer of stylus 53 (i.e., transducer of stylus 53 is acoustically loaded), alternating with pit regions which effect a second impedance in the transducer of stylus 53 (i.e., transducer of stylus 53 has an impedance substantially equal to the impedance of the transducer in the free state).

The signals from stylus 53 are delivered via demodulator 65 to signal processing circuitry 67. The information signals previously recorded on the record medium 51 are retrieved at the output of the processing circuitry 67. When a color television signal has been recorded on record medium 51 the output of the signal processing circuitry 67 may be applied to a color television receiver (not shown) to view the recorded television signals.

Figure 6:
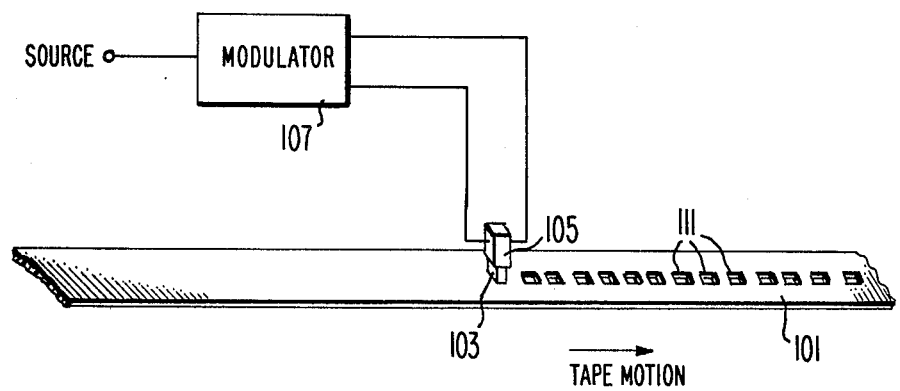
FIG. 6 provides a representation, partially in block diagram form, of a SAW recording apparatus suitable for use in formation of an information record.

To effect recording with a SAW stylus of the type illustrated in FIG. 1 and used in the system of FIG. 6, the driving power is increased. One watt of electric driving power applied to a stylus operating at several hundred MHz is estimated to result in SAW power density of the order of $10^6$ W/cm$^2$ at a stylus tip of a few μm wide (illustratively, 2×2 μm). This level of SAW acoustic power density corresponds to a mechanical stress of about 100 kg-wt/mm² and an amplitude of tip motion of several tens of angstroms. Although the SAW power at the stylus tip is not fully transferred to the record medium, a sufficient power level is transferred such that record medium surface in contact with the stylus tip is disturbed or deformed. This mode of operation, although reminiscent of that of a mechanically vibrating cutting tool, differs in that the vibrating amplitude of the tip is small and that the stylus itself does not undergo gross vibrational displacement.

The recording capability of the stylus is increased when the power, $P_{SAW}$, is highly concentrated at the tip. Most of the SAW power is concentrated within a wavelength of the propagation surface and is thus more highly concentrated at the tip when the SAW wavelength is relatively short.

High SAW power concentration at the tip is also obtained by increasing the input electric power $P_e$, however, this is limited by dielectric breakdown between the IDT electrodes. The upper limit of the power in the IDT structure is particularly dependent upon the electrode finger pair number N.

Figure 5:
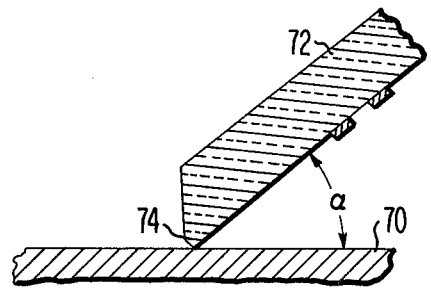
FIG. 5 illustrates a set up for recording information into a metal record medium with a SAW transducer.

Referring to FIG. 5, one setup for recording into a metal (illustratively, copper) record medium 70 is illustrated. SAW stylus 72 which is arranged such that stylus nib 74 contacts record medium 70 makes an angle α (illustratively, 45°) with the surface of record medium 70. It is believed that orienting the stylus at an angle improves the cutting of a stylus (e.g., of quartz) into metal where tip sharpness, hardness and orientation with respect to the recording surface are important.

Referring to FIG. 6, a representation of a SAW recording system suitable for use in the practice of the present invention is provided. A tape 101 (illustratively, of a vinyl material) is moved relative to a stylus 103 (i.e., of a type described with reference to FIG. 1). Stylus 103 is mounted into support 105 such that the stylus tip contacts the surface of tape 101.

Signals from a source are applied via modulator 107 to stylus 103 to form undulations 111 representative of the source of information signals. This mode of operation is similar in most respects with the playback mode as described with respect to FIG. 4 with one major exception. In the record mode the power applied to stylus 103 is sufficient to effect a deformation of the record medium/tape 101 representative of the information to be recorded whereas in the playback mode the power to the stylus is insufficient to effect deformation of the record medium.

Figure 7:
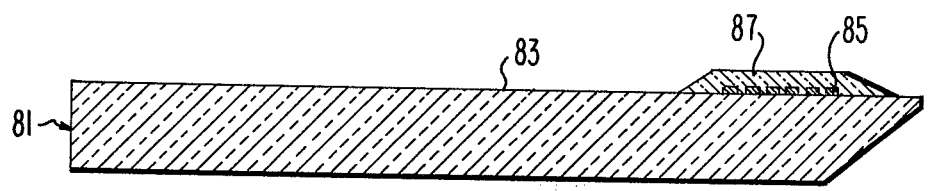
FIG. 7 illustrates an alternative embodiment of the SAW device of FIG. 1.

A side view of an alternative embodiment of the SAW device of the present invention is illustrated in FIG. 7. In certain applications stylus tip wear may become a problem and a harder substrate may be more desirable. FIG. 7 shows a stylus 81 formed of a substrate 83 of a relatively hard non-piezoelectric material (illustratively, diamond or sapphire). Overlying the substrate 83 is an interdigital electrode 85 similar to that described with respect to FIG. 1. Additionally, overlying electrode 85 is a thin piezoelectric film 87 (e.g., a film of 0.4 μm thick of ZnO). In this embodiment the transducer action is implemented by the piezoelectric thin film 87.

Figure 8:
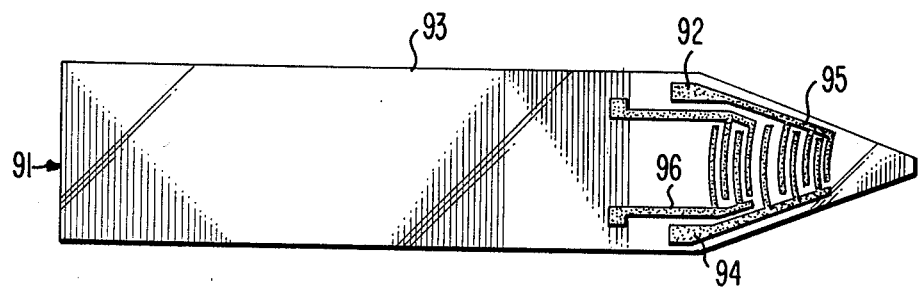
FIG. 8 illustrates a SAW device having a reflector electrode.

To improve the sensitivity of a SAW device, FIG. 8 illustrates another embodiment of the present invention. A SAW device 91 is formed of a substrate 93 having an interdigital electrode 95 formed thereon. Nested between the contacts 92 and 94 of interdigital electrode 95 is a second interdigital electrode 96 which acts as a reflector. Illustratively, reflector electrode 96 is positioned on substrate 93 such that the distance between interdigital reflector electrode 96 and main interdigital electrode 95 is $\lambda(n+\frac{1}{4})$ where $\lambda$ is the wavelength of the surface acoustic wave and n is an integer. It is believed that the reflector electrode 96 tends to further focus and concentrate the SAW energy at the stylus tip.

While the principles of the present invention have been demonstrated with particular regard to the illustrative structures of the FIGURES herein, it will be recognized by those of skill in the art that various departures from such illustrative structures may be undertaken in practice of the invention. For example, in the structure of FIG. 7 the piezoelectric film may be interposed between the substrate and interdigital electrode.

What is claimed is:

1. In a disc record or playback system for recording or retrieving information in the form of surface variations in a disc-shaped record medium, a surface acoustic wave stylus, comprising:
   an elongated member tapered to a tip at one end, said member being arranged to support the propagation of surface acoustic wave in at least one region of said member; and electrode means provided in the vicinity of said tip for focusing surface acoustic waves to said tip.

2. The surface acoustic wave stylus according to claim 1 wherein said focussing electrode means comprises a fan-shaped interdigital electrode.

3. The surface acoustic wave stylus according to claim 2 wherein said fan-shaped interdigital electrode comprises curved fingers.

4. The surface acoustic wave stylus according to claim 3 wherein said fan-shaped electrode is positioned on said member such that the narrowest section of said fan-shaped electrode is in the vicinity of the narrowest portion of said tapered end of said member.

5. The surface acoustic wave stylus according to claim 4 wherein said member is formed from a piezoelectric material.

6. The surface acoustic wave stylus according to claim 4 further comprising:
   a piezoelectric film overlying said fan-shaped interdigital electrode.

7. A surface acoustic wave device, comprising:
   an elongated member tapered to a tip at one end, said member being arranged to support the propagation of surface acoustic waves in at least one region of said member;
   electrode means provided in the vicinity of said tip for focusing surface acoustic waves to said tip, said electrode means comprising a fan-shaped interdigital electrode having curved fingers;
   said fan-shaped electrode being positioned on said member such that the narrowest section of said fan-shaped electrode is in the vicinity of the narrowest portion of said tapered end of said member;
   means, coupled to said interdigital electrode, for generating surface acoustic waves on the surface of said member in said at least one region; and
   means, coupled to said interdigital electrode, for detecting impedance variations of said interdigital electrode;
   whereby said surface acoustic wave device is used to recover information signals recorded on a surface of a record medium and whereby the impedance variations detected by said interdigital electrode are representative of the information signals recorded on said record medium surface.

8. A surface acoustic wave device, comprising:
an elongated member tapered to a tip at one end, said member being arranged to support the propagation of surface acoustic waves in at least one region of said member;
electrode means provided in the vicinity of said tip for focusing surface acoustic waves to said tip, said electrode means comprising a fan-shaped interdigital electrode having curved fingers;
said fan-shaped electrode being positioned on said member such that the narrowest section of said fan-shaped electrode is in the vicinity of the narrowest portion of said tapered end of said member;
said member having a shank end opposite said tapered end; and
a reflecting interdigital electrode interposed between said fan-shaped interdigital electrode and said shank end of said member.

9. In a recording system for recording information signals on a record medium, the apparatus comprising:
a surface acoustic wave stylus having a tapered tip on one end thereof, said tapered tip having a fan-shaped interdigital electrode structure formed thereon; said surface acoustic wave device being supported such that said tapered tip contacts said record medium;
means for establishing relative motion between said tapered tip and said record medium; and
means for coupling said information signals to be recorded to said interdigital electrode structure whereby said tapered tip effects variations in said record medium corresponding to said information signals.

10. In a playback system for recovering information signals recorded in the form of variations in a record medium, the apparatus comprising:
a surface acoustic wave stylus having a tapered tip on one end thereof, said tapered tip having a fan-shaped interdigital electrode structure formed thereon; said surface acoustic wave device being supported such that said tapered tip contacts said record medium;
means for establishing relative motion between said tapered tip and said record medium; and
means, coupled to said interdigital electrode structure, for sensing signals which vary in accordance with variations on said record medium corresponding to said information signals.

* * * * *